United States Patent [19]

Eyssa et al.

[11] Patent Number: 5,315,277

[45] Date of Patent: May 24, 1994

[54] VERTICALLY RIPPLED SUPERCONDUCTIVE MAGNETIC ENERGY STORAGE

[75] Inventors: Yehia M. Eyssa, Tallahassee, Fla.; Xianrui Huang, Lynchburg, Va.; Roger W. Boom, Madison, Wis.

[73] Assignee: Wisconsin Alumni Research Foundation, Madison, Wis.

[21] Appl. No.: 933,448

[22] Filed: Aug. 21, 1992

[51] Int. Cl.$^5$ ............................................. H01F 1/00
[52] U.S. Cl. .................... 335/216; 335/299; 174/125.1
[58] Field of Search ........................ 335/216, 299; 174/125.1

[56] References Cited

U.S. PATENT DOCUMENTS

| | | |
|---|---|---|
| 3,177,408 | 4/1965 | Mills et al. . |
| 3,444,495 | 5/1969 | Thomas . |
| 3,514,730 | 5/1970 | Kassner . |
| 3,919,677 | 11/1975 | Young et al. . |
| 3,980,981 | 9/1976 | Boom et al. . |
| 4,482,878 | 11/1984 | Burgeson et al. . |
| 4,622,531 | 11/1986 | Eyssa et al. ............ 335/299 |
| 4,682,134 | 7/1987 | Laskaris . |
| 5,065,582 | 11/1991 | Seifert ..................... 335/216 |
| 5,115,219 | 5/1992 | Withers et al. . |
| 5,173,677 | 12/1992 | Dederer et al. ............ 335/216 |
| 5,237,298 | 8/1993 | Boom et al. . |

OTHER PUBLICATIONS

B. Nilsson, et al. "Constant Tension Winding in a Single Layer Rippled Solenoids," IEEE Trans. on Magnetics, vol. MAG-19, No. 3, 1983, pp. 354-358.
X. Huang "Low Bending Rippled Structure Design and Frictional Energy Disturbances Analysis For Superconductive Magnetic Energy Storage," paper presented at 1990 Applied Superconductivity Conference, Snowmass Village, Colo., Sep. 24-28, 1990.
N. J. Pfotenhauer, "Stability Measurements on the 50 kA SMES Conductor," Cryogenics, vol. 31, Jul., 1991, pp. 538-542.

*Primary Examiner*—Lincoln Donovan
*Attorney, Agent, or Firm*—Foley & Lardner

[57] ABSTRACT

A superconducting energy storage magnet is constructed for mounting in relatively shallow trenches or tunnels to provide superconductive energy storage for applications such as power system load leveling. The magnet includes composite superconductors arranged in substantially planar coil layers around a central axis. A first and second coil layer have an inner support structure between them to which the conductors of the layers are engaged. The inner support structure carries the magnetically induced forces on the conductors of the coils. The net radial magnetically induced force is opposed by the rigid structural material of the inner support structure and by support struts which extend from the periphery of the inner support structure to a surrounding support wall such as the wall of a trench. The conductors in each layer, and the inner support structure between them, have matching vertically (axially) undulating ripples over the circumference of the magnet. The ripples accommodate stresses imposed on the magnet during cool down from ambient temperatures to cryogenic temperatures, while the inner support structure is rigid radially to carry the magnetically induced radial forces on the conductors so that substantially no flexing of the conductors occurs during charge up and discharge of the magnet.

26 Claims, 3 Drawing Sheets

VERTICALLY RIPPLED SUPERCONDUCTIVE MAGNETIC ENERGY STORAGE

FIELD OF THE INVENTION

This invention relates generally to the field of electrical energy storage magnets and particularly to superconductive magnetic energy storage (SMES) systems.

BACKGROUND OF THE INVENTION

Energy storage systems using large superconducting magnets have been proposed for leveling daily load requirements on electrical utility systems. Excess energy generated during off-peak hours can be stored and later returned to the power grid during high demand periods. By connecting the superconducting energy storage magnet to the power system with a bridge-type inverter, it is possible to obtain very efficient energy transfer between the storage magnet and the power system, as more fully described in U.S. Pat. No. 4,122,512 to Peterson, et al., incorporated herein by reference.

The large energy storage magnets proposed for storing sufficient energy to allow load leveling on a power grid utilize multiple turns of composite conductor formed of normal and superconducting material. The current flowing in the turns of the magnet naturally produces a net magnetic field and any conductor in the field will experience a force at each point on the conductor oriented at right angles to the current and the magnetic field. Since superconducting magnets of the size proposed for electrical system energy storage will conduct extremely large currents and will generate strong magnetic fields, the forces experienced by the conductors will be very large. Since no conductor by itself could possibly withstand the forces that would be exerted on the conductor under these conditions, an external support structure capable of resisting the large loads imposed on the conductor is thus necessary.

However, substantial practical difficulties are encountered in supporting the superconducting magnet because of the supercooled conditions under which the magnets must be operated. For example, the support structure must not add a significant thermal load on the cooling system.

Further, the system must be capable of adjusting to the expansions and contractions encountered during the initial cool-down of the system and any subsequent heating and cooling cycles. For example, the system would preferably be built and installed in a warm structure, such as bedrock, which is at normal ambient temperatures (e.g., 50° to 70° F.). The system must therefore be designed to withstand the thermal stress caused by the temperature change from ambient installation temperatures to cryogenic operating temperatures (approximately 4K). The system must be able to accommodate the thermal stresses due to the cool-down process to ensure structural reliability.

One approach to the problem of adequately supporting a superconducting energy storage magnet is shown in U.S. Pat. No. 3,980,981 to Boom, et al., incorporated herein by reference. The structure disclosed in that patent includes a composite superconducting-normal conductor which is rippled radially with the ripples lying in a plane normal to the net magnetic field experienced by the conductor. The ripples are designed to absorb the magnetically induced stresses associated with charge up of the magnet. Support columns extend radially to an outer support wall which may be formed in bedrock. The columns are made of insulating material and the necessary thermal shielding Dewar is accommodated around the conductor with minimal interference from the radial support members.

Another approach to the problem of adequately supporting a superconducting magnet is shown in U.S. Pat. No. 4,622,531, issued to Eyssa, et al., incorporated herein by reference. The structure disclosed in this patent includes two separate coils of one layer each of composite superconductor, disposed so that the forces experienced by the conductors at each point on the conductor are directed primarily inward toward the other conductor. The conductors are also rippled in a direction normal to the net magnetic field to absorb the magnetic stresses.

A further approach is described in related U.S. application Ser. No. 07/586,496 by Boom, et al. filed on Sep. 21, 1990, now U.S. Pat. No. 5,237,298, issued Aug. 17, 1993. A system is disclosed therein having vertically stacked coils disposed at an angle with respect to the axis of the coil in a trench dug into bedrock. The coils are also rippled with the undulations lying in planes which are substantially orthogonal to the axis.

Previous SMES systems generally have been designed to accommodate thermal and magnetic stresses within the support structure. Compromises between acceptable thermal and magnetic stresses were required to provide a system with the smallest acceptable bending stiffness. This compromise generally can result in significant working (straining, lengthening, bending) of the conductors in such systems, and this working of the conductors due to magnetically induced forces increases electrical resistance over time, and thereby decreases stability. Prior support designs typically require many struts to transfer the net radial forces to the warm structure (bedrock) and the coils are relatively high, requiring deep trenches. Further, special mechanisms are often necessary to accommodate the large vertical displacement of the magnet structure due to structure cooldown and axial magnetic loading.

SUMMARY OF THE INVENTION

In accordance with the present invention, a superconducting energy storage magnet is constructed such that it can be mounted in relatively shallow trenches by arranging coils of superconductor in horizontal layers stacked vertically. The turns of conductors in each layer lie substantially in a plane which is perpendicular to the central axis of the coil. The conductors in each layer have vertical ripples therein undulating in a direction parallel to the axis, i.e., away from the plane of each layer. The vertical (axial) ripples in the conductors decouple the thermal stresses associated with cooling of the magnet from the magnetic stresses by making the thermal and magnetic stresses orthogonal to each other, thereby preventing these stresses from becoming additive. Inner support structure between a pair of the coil layers carries the magnetic stresses, which is directed inwardly toward the inner support structure and with a net radial component. The inner support structure is preferably very stiff in the radial direction. Struts arranged around the periphery of the inner support structure transfer the magnetic forces to the surrounding warm structure (bedrock). This stiffness results in very small bending stresses in the inner support structure so the turns of conductors in the coils, which are firmly held by the inner support structure, undergo only small strains as a result of the magnetically induced forces. Thus, the magnetic forces do not tend to work the conductor and deterioration of the efficiency of the system over multiple charge and discharge cycles is minimized.

In accordance with the present invention, fewer struts are needed to transfer the net radial forces from the inner support structure to the warm structure than were required with prior designs, even though the total load and total strut cross-section remains the same. Thus, the system cost and complexity are decreased. Since the thermal stresses are decoupled from magnetically induced stresses, and the only radial forces are magnetic forces, more efficient struts can be utilized. Also, special mechanisms associated with the struts are not required to accommodate vertical displacement during cool-down since thermal stresses are accommodated by the vertical ripples. The struts may thus be rigid elements which may be tightly engaged between the inner support structure and the warm external support walls even before cool down.

Further objects, features and advantages of the invention will be apparent from the following detailed description when taken in conjunction with the accompanying drawings.

DETAILED DESCRIPTION OF THE INVENTION

Figure 1:
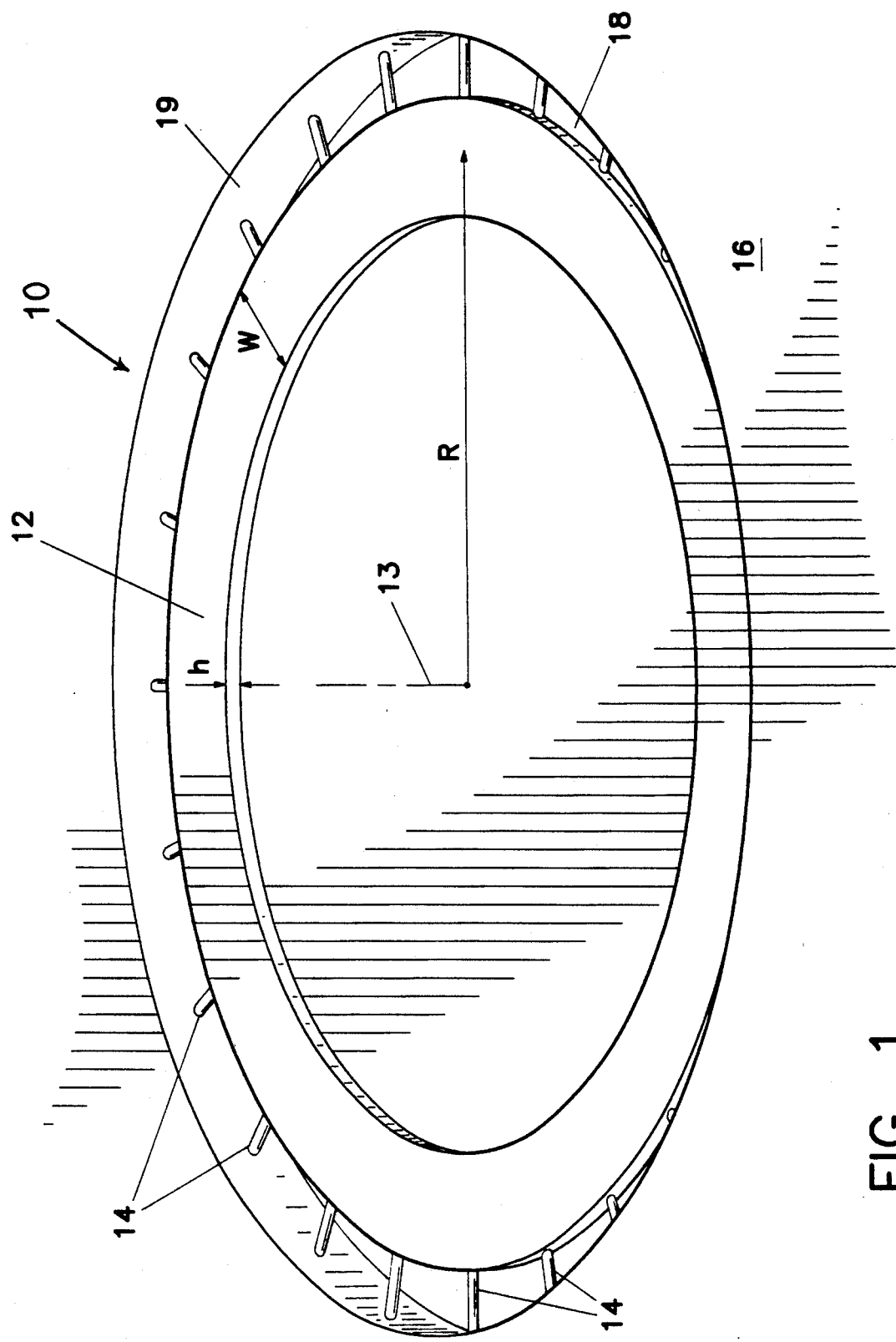
FIG. 1 is a schematic view illustrating the preferred layout of an energy storage magnet in accordance with the present invention shown illustratively disposed in a trench.

Referring to FIG. 1, an illustrative large scale energy storage magnet system 10 in accordance with the present invention is constructed in a cylindrical trench 18 excavated from a warm structure such as solid earth or bedrock 16. The system 10 includes a magnet 12 coupled to a peripheral wall 19 of the trench in the bedrock 16 by struts 14 which provide support for resisting radial outward forces on the magnet. The magnet 12 has a radius R, as measured from a central axis 13, which may be in the range of several hundred meters for a large scale energy storage system, and the trench 18 is typically several meters wide and deep. The trench may be constructed as a tunnel. The magnet 12 has a relatively flat profile, and generally the width of the magnet will be substantially greater than the height. The magnet 12 is electrically coupled to a power plant (not shown) and a transmission grid (not shown). This coupling may be accomplished, for example, as described in U.S. Pat. No. 4,122,512.

Figure 3:
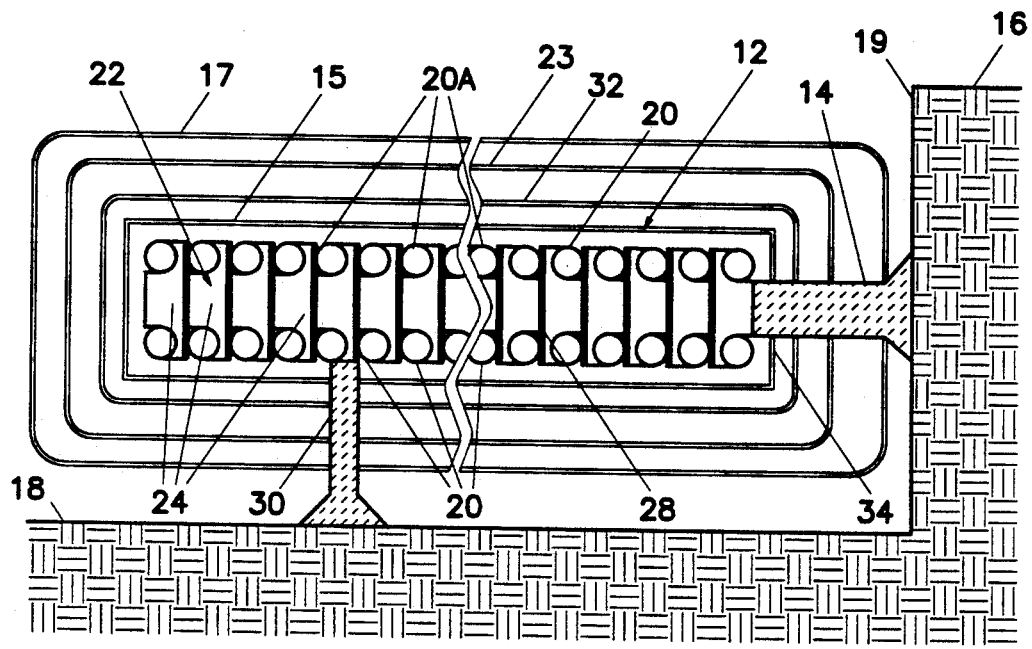
FIG. 3 is a cross-sectional view through one side of the magnet and the adjacent support wall.

As shown in FIG. 3, the magnet 12 is preferably contained in a liquid helium vessel 15 which is itself surrounded by a vacuum vessel or Dewar 17. The vessel 15 holds a liquid helium bath in which the conductors 20 of the magnet 12 are immersed for cryogenic temperature operation required for typical low temperature superconductors such as niobium-titanium and niobium-tin. Of course, other cryogenic coolants may be used as appropriate for higher temperature superconductor. The radial magnetic forces on the magnet 12 are transferred by the struts 14 to the warm structure 16 (e.g., bedrock) at the wall 19 of the trench 18, which may be lined with concrete. The Dewar 17 is mounted within the trench 18 to surround and insulate the magnet 12 to maintain it at cryogenic temperatures. The Dewar generally has a "vacuum" maintained between two walls of the Dewar. The insulation may also include 28K and 77K thermal shields 32 and 33 between the magnet and the outer wall of the Dewar 17. The struts 14 pass through the outer wall of the Dewar to connect to the support wall 19. The large net force on the magnet 12 will be directed radially outward through the struts 14 to the peripheral wall 19 of the trench 18 as illustrated in FIG. 3. The smaller gravity load from the weight of the magnet, Dewar, and ancillary equipment is supported by relatively small vertical struts 30 which are formed of a low heat conductive material such as epoxy-fiberglass composites.

The above described support system is illustrative of one of various support and insulating structures which may be used with the present invention. The general form of the magnet structure and the materials of the magnet may be, for example, as described in U.S. Pat. No. 4,622,531, which is incorporated herein by reference. The struts 14 may be formed, for example, of rigid fiberglass-epoxy composite tubes which are strong in compression and have relatively low thermal conductivity at cryogenic temperatures.

Figure 2:
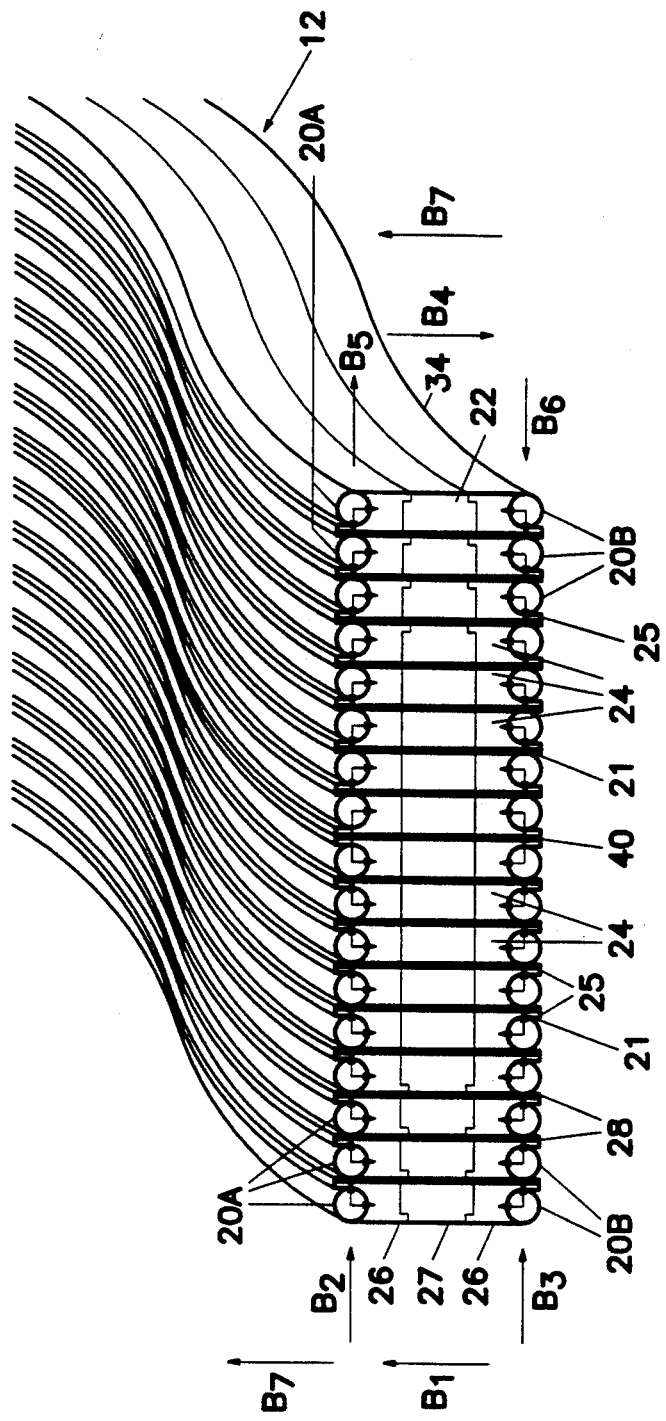
FIG. 2 is a more detailed schematic drawing of a section of the superconducting coils of the magnet of FIG. 1.

With reference to FIG. 2, a portion of the magnet 12 is shown in more detail in accordance with the preferred exemplary embodiment of the present invention. The magnet 12 includes a first coil formed as a substantially horizontal layer of turns of the conductor 20, designated 20A, engaged to an inner support structure 22 having a plurality of support plates 24. Each plate 24 includes grooves 21 in which the conductor turns 20A sit. The grooves 21 may be formed as shown in FIG. 2., being defined by a generally upright side wall 25 with a semi-cylindrical surface on one side of each conductor turn to support the conductor against magnetic forces, as explained further below. A second coil formed of a substantially horizontal layer of turns of the conductor 20, designated 20B, is engaged to the inner support structure 22 at the sides of the support plates 24 opposite to the side to which the conductor turns 20A are engaged. The first and second coils thus form a vertically stacked pair of coils, with the inner support structure 22 between the coils. The support structure plates 24 also include a groove 21 defined by a generally upright wall 25 with a semi-cylindrical surface in which the conductor turns 20B sit. Generally, the conductor turns 20A and 20B form parallel portions of conductor 20, and current flows in the same direction in all turns of the conductor. It is preferred that the conductor turns 20A and 20B are connected electrically in parallel with each other to minimize any voltage difference between the turns 20A and 20B at the positions at which they are in contact with a plate 24.

The radial and vertical force on each conductor turn 20A and 20B is generally in the direction of the arrows shown in FIG. 2. Vertical forces squeeze the turns 20A and 20B toward each other, while radial forces tend to squeeze the plates 24 together radially. Each support plate 24 may be formed in segments, as illustrated in FIG. 2, with outer segments 26 engaging the conductor turns 20A and 20B and an inner segment 27 between the outer segments. The electrically and thermally conductive support plates 24 are preferably separated by insulating plates 28, which may be formed, for example, of an epoxy-fiberglass composition such as G-10 which maintains electrical and thermal isolation between the plates 24, but transmits compressive forces radially from one plate 24 to another. By forming each plate 24 of segments 26 and 27, the segments can slip slightly with respect to one another under magnetically imposed forces to avoid concentrations of stress in parts of the support structure.

The turns 20A and 20B of conductor 20 and the support structure 22 are rippled in a vertical direction, i.e., axially—a direction generally perpendicular to the net radial magnetic force applied to the conductor 20. The vertical ripples 35 are in a direction parallel to the axis 13 of the magnet 12 and are preferably relatively shallow. The outer circumferential surface 34 of the support structure 32 is preferably smooth, not rippled, and preferably is a substantially cylindrical surface.

The vertical undulation or rippling of the support structure 22 and the turns of conductor 20 continues throughout the circumference of the magnet 12. The vertical ripples 35 accommodate the cool-down contraction and warm-up expansion of the magnet 12 so that only small structural stresses are imposed on the support structure 22 and the conductor turns 20A and 20B, resulting in very little working of the conductor 20 due to thermal stresses. The vertical ripples or undulations throughout the circumference of the magnet 12 cause the thermal stresses to be decoupled from the magnetic stresses by making the thermal stresses and the magnetic stresses perpendicular to each other. The magnet 12 is preferably very stiff in the radial direction so that the net magnetic forces are fully transferred to the warm structure 16 by the struts 14. With this design, the magnetic forces do not tend to work the conductor 20 because there is little or no radial expansion of the magnet under magnetic forces.

The support plates 24 of the inner support structure 22 are preferably formed of a metal which is a good conductor of both electricity and heat, such as aluminum, with each plate 24 being engaged with one of the turns 20A and 20B. The plates 24 may extend as continuous structures around the circumference of the magnet, but they may also be formed in welded or bolted sections which are some portion of (substantially) a circle. Preferably, the conductor 20 is a composite conductor formed of superconducting filaments in a matrix of normal conducting metal, as is conventional. A preferred structure for the conductor 20 is given in the paper by M. J. Pfotenhauer, "Stability Measurements on the 50 kA SMES Conductor," Cryogenics, Vol. 31, July 1991, pp. 538-542, incorporated herein by reference. Each of the plates 24 has the semi-circular wall 25 formed therein which conforms to approximately at least one quarter of the periphery of the circular conductor turns 20A and 20B. The wall 25 gives axial and radial support to each turn of the conductor 20 and provides a relatively large contact area over which the magnetically induced forces on the conductor turns 20A and 20B can be applied to the support plate to minimize concentrations of pressure on any point on the conductor. The large area of contact between the plates 24 and the conductor turns 20A and 20B also provides good electrical and thermal contact between the conductor turns 20A and 20B and the support plates 24 to allow conduction of heat away from any localized hot spot in the conductor, as well as shunting electricity from a localized normal portion of the composite conductor 20.

As used herein, the term "vertical ripple" is intended to refer to ripples or undulations in the conductors of the coils, and in the inner support structure, which are substantially parallel to the central axis of the coil. For typical large scale energy storage applications the central axis will be vertically oriented since such magnets will generally be formed underground to allow earth or bedrock to be used as the support wall which absorbs the radial forces from the magnet. Nonetheless, it is understood that the basic principles of the present invention may be utilized in smaller magnets which would not necessarily be built with the central axis vertically oriented.

Figure 4:
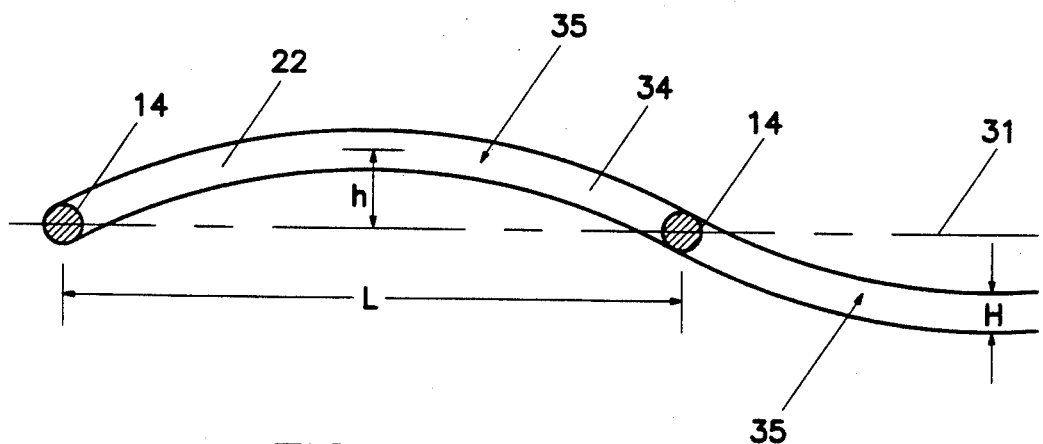
FIG. 4 is a simplified side view of a portion of the magnet illustrating the ripples therein and the positions of the support struts.

The "amplitude" of the vertically (or, equivalently, axially) oriented ripples 35 is selected to provide the necessary accommodation of the thermal stresses imposed on the conductors and the support structure during cool-down. This amplitude is selected to be sufficient to accommodate such cool-down stresses, but not significantly more than is necessary inasmuch as the greater the amplitude of the ripples, the more material must be incorporated in both the conductors of the coils and the inner support structure. Generally, as illustrated in FIG. 4, the peaks of the ripples 35 above and below the central plane 31 of the magnet are substantially equal in amplitude. It is noted that the central planes of each coil layer of turns 20A and 20B will be above or below, respectively, the central plane 31 of the magnet shown in FIG. 4 by one-half the thickness H of the magnet (i.e., the distance between the coil layers). The height of the peaks above and below the central plane will also be selected relative to the "frequency" of the ripples, that is, the number of ripples around the circumference of the coil. Generally, the ratio of the amplitude of the ripple to the length of the ripple will be determined by the amount of ripple required to accommodate the thermal stress imposed on the conductors of the coil and the support structure. As illustrated in FIG. 4, the struts 14 are attached to the periphery 34 of the magnet at the nodes between ripples where the center of the rippled support structure 22 intersects the central plane 31.

Preferably, the dimensions of the ripple are sufficient to accommodate all of the contraction of the support structure and conductor that occurs upon cool-down from normal ambient temperatures to the cryogenic temperatures which are near absolute zero. As a simple example for illustrative purposes only, if the contraction of (an aluminum) support structure and a conductor (which preferably have comparable rates of thermal expansion and contraction) is 0.4%, preferably the additional length provided by the ripple will be sufficient to accommodate the full 0.4% decrease in the circumferential length of the conductor and support structure at any circumferential point on the conductor or support structure with only small stress and corresponding strain in these materials.

The function of the inner support structure 22 and its relationship to the conductors 20 may be described with respect to FIG. 2. For purposes of illustration, it is assumed that the section shown in FIG. 2 is to the right of the axis 13 of the magnet 12 of FIG. 1 and that current is flowing in a counterclockwise direction through each of the turns of conductors 20, that is, in a direction into the paper of the drawing. The upper leftmost conductor turn 20A in the magnet will experience an upward magnetic field component $B_1$ from currents flowing in all of the other adjacent turns of conductors, which will result in a force on the turn of conductor to the right, as shown by the small arrow in FIG. 2. Further, the fields from the other turns of conductors will provide a magnetic field component $B_2$ in a direction to the right as shown in FIG. 2, which will impose a downwardly directed force on the conductor turn, as illustrated by the small downward arrow shown extending from the middle of the conductor turn. Of course, the actual magnetic field imposed on the upper leftmost conductor turn is the vector sum of the magnetic field components $B_1$ and $B_2$, and the net force imposed on the conductor turn is the vector sum of the resolved forces shown by the small arrows in FIG. 2.

The bottom leftmost turn 20B of conductor in FIG. 2 also experiences a magnetic field directed upwardly, which is essentially the same as the magnetic field $B_1$ imposed on the upper leftmost conductor turn, but experiences a magnetic field component $B_3$ directed to the left as illustrated by the arrow in FIG. 2. As a consequence, the bottom leftmost turn of conductor experiences an upward force and a force directed to the right, with the actual force imposed on the conductor comprising the vector sum of these forces.

The upper rightmost turn 20A of conductor in FIG. 2 experiences a magnetic field component $B_4$ directed downwardly and a magnetic field component $B_5$ directed outwardly from the current flowing in the other conductor turns of the magnet which are adjacent to the upper rightmost turn, resulting in forces imposed on the upper rightmost conductor turn directed to the left and downwardly. The lower rightmost conductor turn 20B experiences a downward magnetic field, essentially the same as the field $B_4$ experienced by the upper rightmost conductor, but sees a magnetic field component $B_6$ directed to the left as illustrated in FIG. 2, resulting in an upward force and a force directed to the left imposed on the turn of conductor.

All of the other turns of conductor 20A in the upper coil layer experience a magnetic field component directed to the right, resulting in a downwardly directed force on these turns, while all of the other turns of conductors 20B in the lower coil layer experience a magnetic field component directed to the left, resulting in an upward force on these turns. The upward and downward forces on the conductor turns 20A and 20B are opposed by the support plates 24 which experience a compressive force imposed on them by the conductor turns. All of the other turns of conductors in the pair of coils as one moves away from the rightmost and leftmost turns also experience either an upwardly directed magnetic field component or a downwardly directed magnetic field component, depending on whether the turns are to the left or to the right, respectively, of the center line 40 of the magnet. The net magnetic field in the vertical (axial) direction at the center line 40 due to the adjacent turns is approximately zero. Those turns of conductor 20A and 20B adjacent to the center line 40 thus experience the least (or zero) magnetic field directed either upwardly or downwardly (excluding the net magnetic field as described below). As a consequence of the upper or downward magnetic fields imposed on the conductors, each of the turns of conductors to the left of the central line 40 has a force applied to it to the right, whereas each of the turns of conductors to the right of the center line 40 has a force applied to it to the left. These forces are opposed by the sidewalls 25 of each of the support plates 24, and these forces are supported by the stack of support plates 24 and the insulating members 28, and are experienced by these plates as an inwardly compressive force directed toward the central line 40 of the stack. Because the coils of conductor turns 20A and 20B are arranged in pairs, the forces imposed by these conductor turns are balanced and imposed on the inner support structure 22, rather than being carried and resisted by the conductors themselves.

In addition to the magnetically induced forces imposed on the conductors by the magnetic field from adjacent turns of conductors in the magnet, there is also a net upwardly directed magnetic field $B_7$, which is essentially uniform across all of the conductors 20A and 20B, and which is the resultant sum of the magnetic field from current flowing in the conductor at all other positions in the magnet. This magnetic field $B_7$ produces an outwardly or radially directed force on each conductor, tending to expand the conductor turns outwardly. This force is opposed by the inner support structure 22, particularly by the sidewalls 25 which form, with the outer side of the sidewalls 25 of adjacent plates 24, the notches or grooves 21 within which the turns of conductors 20A and 20B sit. The sum of all the radial forces imposed on all the turns of conductor, transmitted to the inner support structure 22, is opposed by the support struts 14 which transmit those forces to the outer support wall 19. Because the inner support structure 22 is preferably quite rigid, the circumferential tension in the inner support structure combined with the support provided by the struts 14 allows very little radial expansion of the inner support structure under the radial magnetic forces imposed on the turns of conductor, so that the conductor turns 20A and 20B experience very little radial expansion as current in the conductor 20 increases. Consequently, there is very little expansion and contraction, and consequent straining, of the composite conductor during charging and discharging of the magnet. It may be noted that the net field $B_7$ will add to the vertically oriented field imposed on the turns to the left of the centerline 40 and subtract from the field applied to turns on the right of the centerline. For this reason, the net radial force on the rightmost turns may be substantially to the left (inwardly).

The magnet radius R is a key design parameter for a large scale SMES system. Generally, a larger radius means higher cost and higher efficiency (smaller heat leak). A large SMES can have a very large radius. For example, the radius of a 5500 MWh SMES is about 500 m.

The coil width W depends on the conductor design and the choice of the number of (horizontal) coil layers. Once the conductor design and the number of layers is chosen, the linear current density (current per unit length of coil width), J', is fixed. The coil width for a two coil layer design is given by $$W = \frac{1}{J_1'} \sqrt{\frac{2}{\mu_0 f} \frac{E}{R}} \qquad (1)$$

where J' is in amperes per meter (A/m), E is the SMES stored energy (in joules J), $\mu_0 = 4\pi \times 10^{-7}$ (Tesla m/A)

is the permeability of free space, and f is a shape factor given by $$f \simeq \ln \frac{8R}{w} - 0.5 \quad (2)$$

Two requirements for the cold compressive structure 22 determine the height H (or thickness) of the magnet. The structure 22 carries the compressive magnetic forces, which leads to the requirement that:

$$H \simeq \frac{1}{2\pi R w} \cdot \frac{1.386}{f} \cdot \frac{E}{\sigma_c} \quad (3)$$

where $\sigma_c$ (in pascals Pa) is the maximum allowable compressive stress of the structure. The structure 22 also absorbs the energy of the coil during an emergency energy dump to protect the coil from overheating. This leads to a protection requirement for H:

$$H = \frac{1}{2\pi R w} \cdot \frac{E}{u(T_f)} \quad (4)$$

where $u(T_f)$ is the volumetric heat capacity of the structure material from cryogenic temperature to $T_f$, the maximum allowable temperature of the coil. If the structure is aluminum and $T_f = 475K$, then $u = 9.08 \times 10^8$ J/m$^3$ and equation 4 above becomes $$H = \frac{1.753 \times 10^{-10} E}{Rw} \quad (5)$$

H is determined by equations 3 or 4, which ever is larger.

Using these criteria, exemplary dimensions for a 5500 MWh SMES are R=500 m, W=20 m, and H=0.4 m.

Note that at H=0.4 m, $\sigma_c$=227.5 Mpa=33 ksi, and the minimum height by the protection requirement (equation 5) is 0.347 m. Thus, the larger value, 0.4M, would be used.

The ripple frequency is related to the strut spacing. The length of a ripple is the spacing L between the struts 14. It is determined by the force, F (in newtons N), that a strut 14 can transfer, and thus $$L = \frac{f}{1+f} \cdot \frac{2\pi R^2 F}{E} \quad (6)$$

A typical L for the above mentioned 5500 MWh SMES magnet is 10 m.

Each ripple 35 in the support structure 22 and the conductors 20 supported by it (not shown in FIG. 4) will preferably have the form of an arc of a circle. The ripple height h above the central plane 31 depends on the maximum allowable cool-down stress, structure bending stiffness, strut spacing, and structure material modulus and thermal shrinkage from room temperature to cryogenic temperature. During a coil cool-down, thermal shrinkage of the coil generates tension forces as well as bending moments in the structure. Obviously, the softer the structure, the smaller the tension forces and bending moments. Letting n be the number of structure horizontal segments 26 and 27 and h the ripple height, the tension force and the maximum bending moment are $$N = \frac{h^3}{n} \cdot \frac{\alpha Y}{n^2 L^2 f_1 + h^2 f_2}, \quad (7)$$

$$M = \frac{NL}{2} \cdot \frac{1 - \cos\theta}{\sin\theta}, \quad (8)$$

$$f_1 = \frac{3\theta - 9\cos\theta\sin\theta + 6\theta\cos^2\theta}{2\sin^3\theta}, \quad (9)$$

$$f_2 = \frac{\theta}{\sin\theta}, \quad \theta = 2\tan^{-1}\frac{2H}{L},$$

where Y (in Pa) is the material modulus, $\alpha$ is the thermal shrinkage coefficient from room temperature to cryogenic temperature, N (in newtons) is structure cool-down tension force, and M (in newton-meters) is the maximum cool-down bending moment. The ripple height h is determined by $$\frac{nN}{h} + \frac{6n^2 M}{h^2} = \sigma_a \quad (10)$$

where $\sigma_a$ (in Pa) is the maximum cool-down stress and n is the number of segments 26 and 27 in the support plates.

For the above mentioned example of a 5500 MWh SMES magnet, if the structure is aluminum, then $\alpha = 0.43\%$ and Y=70 GPa. For L=10 m and $\sigma_a$=68.9 MPa=10 ksi, the ripple height is h=0.83 m for n=2, h=0.56 m for n=3, and h=0.42 m for n=4.

It is apparent that the height h of the magnet above and below its central plane 31 will also be the height of each of the coil layers (not shown in FIG. 4) above and below a central plane through each layer.

To increase the energy storage capacity of the magnet, the magnet may be formed of two or more magnet units 12 each comprising pairs of first and second coil layers of turns 20A and 20B, with inner support structure 22 between the coils. The magnet units 12 are arranged in the trench 18 in axially stacked relation, but may otherwise be formed and supported as described above for the single magnet unit 12.

It is understood that the invention is not confined to the particular embodiments described herein, but embraces such modified forms thereof as come within the scope of the following claims.

What is claimed is:

1. An electrical energy storage magnet, comprising:
    (a) a coil of superconductive conductor arranged in turns in a layer about a central axis and having axially undulating ripples in the conductor;
    (b) an inner support structure engaged with the turns of conductor to carry magnetically induced forces imposed on the conductor and axially undulating to match the conductor to which the support structure is engaged;
    (c) a support wall formed of structural material which substantially surrounds the periphery of the coil layer and the inner support structure; and
    (d) a plurality of support struts extending from the support wall to engage the inner support structure and oppose radial expansion of the inner support structure under magnetic forces imposed on the structure by the coil.

2. The magnet of claim 1 further comprising a second coil of superconductive conductor arranged in turns in a layer about the central axis and having axially undulating ripples therein, the inner support structure also engaging the turns of conductor of the second coil layer to carry the magnetically induced forces imposed on the conductor.

3. The magnet of claim 1 wherein the conductor is a composite conductor formed of a superconducting material and a normal metal.

4. The magnet of claim 2 wherein the inner support structure includes support plates, each support plate engaging one turn of conductor in the coil of the first coil layer and one turn of conductor in the coil of the second coil layer, and insulating members between adjacent support plates.

5. The magnet of claim 4 wherein each support plate includes a first segment engaging a conductor turn of the first coil layer, a second segment engaging a conductor turn of the second coil layer, and an intermediate segment located between the first and second segments.

6. The magnet of claim 2 wherein there are a plurality of first and second coil layers with inner support structure between each pair of coil layers, the pairs of coil layers and inner support structure in axially stacked relationship.

7. The magnet of claim 2 wherein the conductors of the first and second coil layers are electrically connected in parallel.

8. The magnet of claim 1 wherein the outer peripheral surface of the inner support structure is substantially cylindrical.

9. The magnet of claim 1 including vertical struts of low thermal conductivity connected to support the weight of the magnet.

10. The magnet of claim 1 wherein the structural material of the support wall is bedrock.

11. The magnet of claim 1 wherein the ripples in the coil conductor and inner support structure each have the form of a partial arc of a circle.

12. A superconducting energy storage magnet comprising:
(a) a first coil of turns of a conductor arranged about a central axis substantially in a plane perpendicular to the axis to form a first coil layer, the conductor of the first coil formed of a composite of a superconducting material and a normal conducting metal;
(b) a second coil of turns of a conductor arranged about the central axis substantially in a plane perpendicular to the axis to form a second coil layer, the conductor of the second coil formed of a composite of a superconducting material and a normal conducting metal, the second coil layer spaced below the first coil layer; and
(c) an inner support structure between the first and second coil layers, the inner support structure having grooves with sidewalls which engage and hold the turns of conductors of the first and second coil layers, the inner support structure engaging the turns of the first and second coil layers to oppose magnetically induced forces on the turns of the first and second coil layers directed inwardly toward the inner support structure and also radially outward, the inner support structure and the first and second coils having matching axially undulating ripples therein extending around the circumference of the first and second coils and the inner support structure, the inner support structure having an outer periphery, whereby thermal stresses associated with the first and second coils and the inner support structure are relieved by the ripples.

13. The magnet of claim 12 including support means for engaging the inner support structure and resisting radially outward forces on the inner support structure resulting from magnetic forces on the coils.

14. The magnet of claim 12 wherein the maximum height of the ripples above a central plane extending through each coil layer is sufficient to accommodate the thermal contraction of the magnet as it is cooled down from normal ambient temperatures to cryogenic temperatures near absolute zero.

15. The magnet of claim 12 wherein the inner support structure includes support plates, each support plate engaging one turn of conductor in the coil of the first coil layer and one turn of conductor in the coil of the second coil layer, and insulating members between adjacent support plates.

16. The magnet of claim 15 wherein each support plate includes a first segment engaging a conductor turn of the first coil layer, a second segment engaging a conductor turn of the second coil layer, and an intermediate segment between the first and second segments.

17. The magnet of claim 12 wherein there are a plurality of first and second coil layers with inner support structure between each pair of coil layers, the pairs of coil layers and inner support structure in axially stacked relationship.

18. The magnet of claim 12 wherein the outer peripheral surface of the inner support structure is substantially cylindrical.

19. The magnet of claim 13 wherein the support means comprises radially extending struts of low thermal conductivity material extending from engagement to the outer periphery of the inner support structure to engagement with an outer support wall which surrounds the magnet.

20. The magnet of claim 19 including an insulating Dewar surrounding the magnet, and wherein the support struts pass through the Dewar to engage the outer support wall.

21. The magnet of claim 19 wherein the structural material defining the support wall is bedrock.

22. The magnet of claim 19 wherein the support struts engage the outer periphery of the inner support structure at node positions between adjacent ripples.

23. The magnet of claim 12 wherein the height of the magnet from the first coil layer to the second coil layer is substantially less than the radial width of the coil layers.

24. The magnet of claim 12 wherein the conductors of the first and second coil layers are electrically connected in parallel.

25. The magnet of claim 13 further including vertical struts of low thermal conductivity connected to support the weight of the magnet.

26. The magnet of claim 12 wherein the ripples in the coil conductors and inner support structure each have the form of a partial arc of a circle.

* * * * *